3,382,416
ADJUSTABLE PANEL ASSEMBLY FOR
ELECTRICAL APPARATUS
Lewis W. Jacobs, Garden City, N.Y., and Joseph J.
Mrowka, Plainville, Conn., assignors to General
Electric Company, a corporation of New York
Filed May 11, 1967, Ser. No. 637,729
4 Claims. (Cl. 317—119)

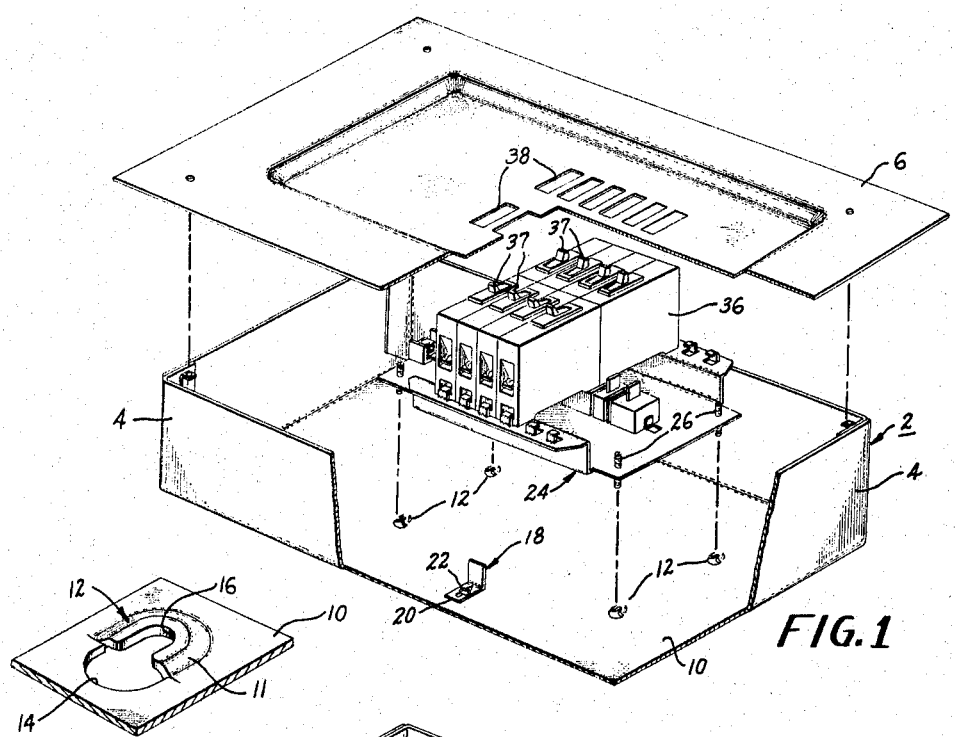
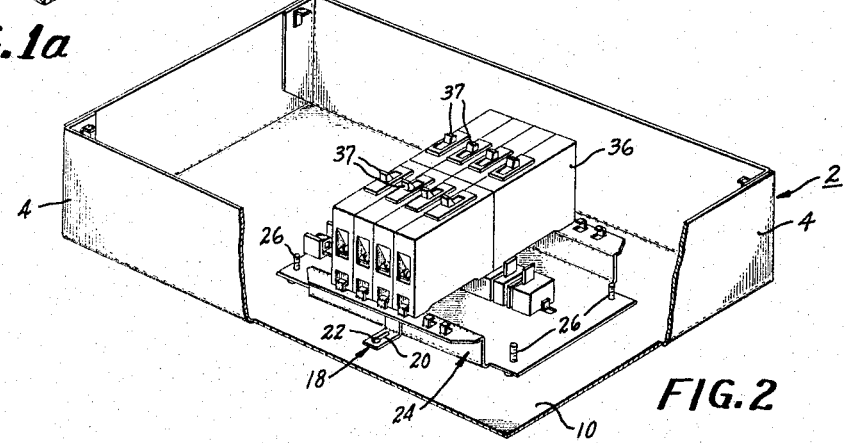
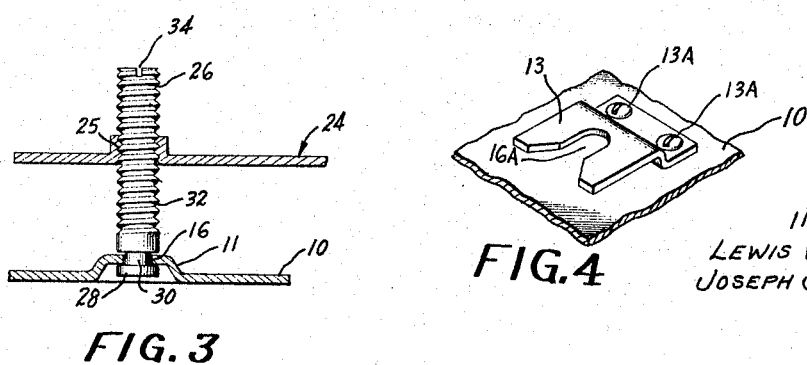 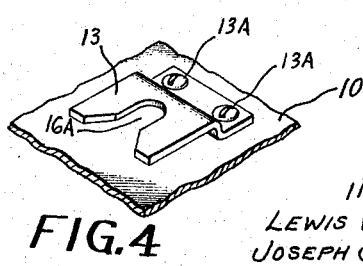
INVENTORS.
LEWIS W. JACOBS,
JOSEPH J. MROWKA United States Patent Office 3,382,416
Patented May 7, 1968

ABSTRACT OF THE DISCLOSURE

An enclosed circuit breaker panel assembly includes an enclosure having an "interior" assembly mounted therein on the back wall. The "interior" assembly comprises a supporting pan having busbars and circuit breakers mounted thereon. The supporting pan has four adjusting screws, at the corners, each screw having a circumferential groove adjacent its lower end. The back wall has inwardly-offset portions having slots cut therein so that the interior assembly can be slid laterally to move the grooved portions of the screws into the slots of the offset portions. The assembly is then held from reverse lateral movement by an L-shaped bracket which is attached adjacent one edge of the supporting pan but which still permits adjusting movement of the assembly toward and away from the back wall.

---

This invention relates to electrical apparatus housings, and more particularly, to such housings having internal panels for mounting of various electrical components.

Because of safety factors and the desire to protect various electrical components from persons, as well as environmental conditions, it is well known to mount electrical power distribution components such as switches, circuit breakers, and fuses upon a panel or saddle situated in a housing which provides an enclosure therefor, generally known as a "load center." Because repairs or adjustments must be made to the electrical components from time to time, it is desirable that the panel be removably mounted in the housing. In addition, field installation of the housing in a wall to provide a flush installation will oftentimes dictate variations in the disposition of the panel with respect to the back plate since the cover and trim are usually mounted on the wall separately from the back plate and sides of the housing. Because the back plate may be disposed too deeply in a recess in the wall, a rigidly positioned mounting panel might result in the failure of the electrical components such as the breaker handles to be improperly aligned in openings provided therefor in the cover.

Although it is possible to mount the panel on threaded studs captured on the back of the housing so that rotation of the studs will raise or lower the panel by reason of its threaded engagement of the panel therewith, it is generally necessary to completely unscrew the panel when removing it and to rethread the screws when returning the panel to its installed position, and it requires additional time to readjust the panel to a proper position once it is installed.

It is therefore a primary object of the present invention to provide a novel electrical apparatus panel assembly having an adjustable panel for mounting electrical components which is easily installed therein or removed therefrom.

Another object is to provide such a panel assembly having an adjustable panel which may be readily removed from and reinstalled in the enclosure without altering the adjusted position thereof within the enclosure.

A further object is the provision of such a panel assembly which is relatively simple and economical to manufacture and which may be disassembled in the field without loose parts.

A specific object of the present invention is the provision of a novel load center housing having an adjustable panel for mounting the electrical components which may be readily adjusted relative to the rear wall of the enclosure from a position closely adjacent thereto and which may be readily and speedily removed and reassembled by operation of independent locking means.

It has now been found that the foregoing and related objects can be readily attained in an adjustable panel assembly for electrical apparatus housing such as a load center wherein the panel for mounting the electrical components has a plurality of threaded holes spaced thereabout which threadably receive the threaded shanks of fasteners so as to be adjustably supported along the length thereof. The ends of the fasteners extending rearwardly of the panel are releasably engaged in apertures in a support plate such as might normally form the back wall of the housing or box in a manner which permits rotation of the threaded fasteners so as to adjust the spacing of the mounting panel relative to the support plate and which permits removal of the mounting panel and fasteners as a unit from the support panel. Locking means on the support plate releasably engage the panel and the fasteners in assembly with the support panel but may be disengaged to release the unit.

More particularly, the support plate has a plurality of generally keyhole-shaped slots therein having portions of reduced width extending in a single (the same) direction from the portions of enlarged width, and the spacing of the enlarged portions of the slots is substantially identical to that of the threaded apertures in the mounting panel so that they may be aligned. The end of the threaded fasteners engaged with the support plate has a head of greater width than the reduced portions of the slot but lesser in width than the width of the enlarged portion of the slot so that it may be readily inserted and removed therefrom. A neck portion adjacent the head is of sufficiently reduced width to be smaller than the reduced portion of the slot and thus to freely slide therein. Preferably, the neck portion is not only reduced with respect to the head but also the shank portion of the fasteners so as to provide shoulders at either end thereof which may abut and slide against the opposite surfaces of the support plate along the reduced portion of the slot and thus act to locate and position it with respect thereto. Since the opposite end of the fastener must be rotated to effect the desired adjustment, it should be configured so as to permit facile engagement by a tool. For example, it may have a slot in its end face to receive the blade of a screwdriver, or it may have a polygonal cross section for engagement by a wrench.

Although various releasable means may be employed to lock the adjustable panel and fasteners to the support plate such as threaded fasteners seated in the mounting plate with an enlarged head portion adapted to engage a portion of the support panel and be moved from engagement therewith, a highly desirable locking means is provided by one or more slide members or keepers. By use of the slide member in combination with the keyhole-shaped slots, the slide may be locked in position on the support plate against the side of the mounting panel in a position retaining the threaded fasteners in the reduced portions of slots. One or more threaded fasteners extend through an elongated slot therein so that tightening or loosening these fasteners will permit the slide to be moved towards or away from the mounting panel and thus cam it into, or permit the fasteners thereon to move outwardly from, the reduced portion of the slots. Such a slide will generally be of L-shaped configuration with one leg sliding upon the support plate and the other leg bearing against the mounting panel.

Since the housing will normally have side walls, the support plate should be dimensioned, and the keyhole-shaped slots located, so as to permit the amount of lateral sliding movement necessary to disengage the adjusting fasteners from the slots. It will be appreciated that the present invention permits the mounting plate to be adjusted from a position closely adjacent the support plate to closely adjacent the cover depending upon the length of the adjusting fasteners and the particular installation. Thus, the electrical components on the mounting panel may be disposed in the proper position within apertures in the cover, although the box portion may have been seated too deeply within a recess formed in the wall where the installation is being made. Once adjusted, the unit provided by the adjusting fasteners and mounting panel may be removed readily or reassembled without altering the adjusted position of the fasteners.

Since only a single locking member is necessary to hold the panel in place, a simple removal of the panel is permitted which is much faster than is the removal of all of the adjusting screws in accordance with the prior art proposals. Because of the fact that the adjustable threaded fastener is not assembled to the support plate in a captive position, field or factory assembly of the apparatus is simplified.

Additional objects and aspect of the invention will be pointed out in the following detailed description and illustrated in the accompanying drawings and the scope will be particularly pointed out in the appended claims.

In the drawings:

FIGURE 1 is a fragmentary perspective view of a load center embodying the present invention with portions of the housing broken away for clarity of illustration and with the mounting panel disassembled from the support plate but aligned for assembly;

FIGURE 1A is a fragmentary view of a fastener retaining means for use in the invention;

FIGURE 2 is a similar view of the load center showing the mounting panel seated upon the support plate;

FIGURE 3 is a fragmentary cross-sectional elevational view showing the adjustable threaded fastener seated in the mounting panel and the support panel; and FIGURE 4 is a fragmentary view of modified fastener retaining means for use in the invention.

Referring now in detail to the drawings, a load center housing generally designated by the numeral 2 is fragmentarily illustrated and includes a box formed by the back or support plate 10 and side walls 4 which may be mounted within a recess within a wall (not shown) and a cover and trim assembly 6 to be mounted on the surface of the wall. The back plate 10 has a plurality of generally keyhole-shaped slots 12 therein, each having an enlarged portion 14 and a reduced channel portion 16, and the reduced channel portions 16 all extend in the same direction from their respective enlarged portions 14. The slots 12 are disposed in upwardly deformed portions 11 of the support plate 10 for a purpose to be described hereinafter.

A mounting panel 24 which is to be adjustably mounted on the plate 10 is provided with a plurality of tapped or threaded apertures 25 spaced thereabout and spaced substantially identically to the spacing of the slots 12. Mounted on the panel 24 are a plurality of electrical components 36, herein shown as circuit breakers, with operating handles 37 which project through apertures 38 in the cover 6.

A plurality of threaded fasteners 26 have a threaded shank portion 32 threadably engaged within the threaded apertures 25 and the end extending rearwardly from the panel 24 seated rotatably in the slots 12. At the opposite or front end, a slot 34 is provided for engagement with a screwdriver blade (not shown) to effect rotation thereof. As can best be seen in FIGURE 3, the fasteners 26 have a head 28 which is of greater width than the channel portion 16 of the slots 12 but of lesser width than the enlarged portion 14 so as to be trapped within the reduced channel portion 16. Adjacent the head 28 is a neck portion 30 of a width less than that of the head 28 and of the reduced channel portion 16 so that it will freely slide within the slot 12. The neck portion 30 is also of lesser width than the shank portion 32 so that shoulders are provided at either end thereof of greater width than the reduced channel portion 16, thus positively positioning the end of the fasteners 26 in the support plate 10. As can be seen, the upwardly deformed portions 11 provide a recess in which the head 28 of the fasteners 26 may slide without binding upon a planar surface behind the support plate 10.

A slide or keeper 18 of generally L-shaped configuration is slidably mounted on the support plate 10 by means of the threaded fastener 22 which extends through an elongated slot 20 therein and seats in the support plate 10. By tightening the fastener 22, the slide 18 may be locked in a desired position on the support plate 10. As can be seen, the slot 20 is parallel to the reduced channel portions 16 of the slots 12, and the support plate 10 is larger in dimension than the mounting panel 24.

The apparatus of the present invention is shown assembled in FIGURE 2 wherein it can be seen that each of the fasteners 26 has been inserted into the aligned keyhole slot 12, and the panel 24 has been slid in the direction of the reduced channel portions 16 (to the upper right as shown in FIGURE 2) so as to engage the heads 28 of the fasteners 26 with the reduced channel portions 16 of the slots 12. Additionally, the L-shaped slide 18 has been slid in a similar direction (to the upper right as shown in FIGURE 2) and locked in place by the fastener 22 so as to prevent backward sliding of the panel assembly. In order for the panel 24 to be removed from the plate 10, all that is required is loosening of the fastener 22 so as to permit sliding the L-shaped slide 18 into a retracted position (as shown in FIGURE 1), and then sliding the assembly including the panel 24 and fasteners 26 in a similar direction (to the lower left as shown in FIGURE 2) so that the heads 28 of the fasteners 26 pass through the enlarged portions 14 of the keyhole-shaped slots 12; thereafter, the panel 24 with the fasteners 26 in their adjusted position may be lifted away from the plate 10. Since this operation does not involve turning of the fasteners 26, the reinstallation of the panel 24 upon the plate 10 will require no readjustment of the fastener 26 and the panel 24 will be properly positioned. To adjust the position of the panel 24 relative to the cover 6 so that the handles 37 project through the apertures 38 to the desired extent, fasteners 26 are rotated to the desired length of projection rearwardly from the panel 24. This may be done a few turns at a time while the panel is installed on the support plate 10. Alternatively, the measurement can be established, the panel 24 and fasteners 26 removed from the support plate 10, and the adjustment made while disassembled.

In order to assure that the keeper 18 will retain the panel 24 regardless of changes in the distance of the panel 24 from the support plate 10 caused by adjusting screws 26, the upstanding portion of the keeper 18 is preferably made at least as high as the maximum permitted spacing of the panel 24 from the plate 10.

In FIGURE 4, an alternate construction is shown, in which a separate bracket 13 is used. The bracket 13 is attached to the support plate 10 by suitable means, such as by screws 13A. A slot 16A in the bracket 13 serves the same purpose as the slot 16 in the form shown in FIGURE 1.

Thus, it can be seen that the present invention provides a novel electrical apparatus panel assembly having an adjustable panel for mounting the electrical components which may be easily installed therein or removed therefrom. Installation or removal may be effected simply and rapidly without altering the adjusted position of the panel with respect to the support plate of the enclosure. It can be seen that the assembly is relatively simple and economical to manufacture and affords a wide range of adjustment so as to ensure proper positioning of the electrical components with respect to a cover panel and thereby a highly desirable flush installation.

While the invention has been shown in one specific preferred embodiment, it will be readily apparent that many modifications thereof may be made without departing from the spirit of the invention. It is therefore intended by the appended claims to cover all such modifications as fall within the true spirit and scope of the invention.

What we claim as new and desire to secure by Letters Patent of the United States is:

1. An adjustable panel assembly for electrical apparatus comprising the combination of:
   (a) a panel for mounting electrical components thereon having a plurality of threaded apertures spaced thereabout;
   (b) a support plate having a plurality of apertures therein substantially aligned with said apertures in said mounting panel;
   (c) a plurality of threaded fasteners having one end rotatably seated in said support plate apertures and a shank portion threadably engaged in said threaded apertures of said mounting panel;
   (d) locking means on said support plate releasably engaging said mounting panel and holding said fasteners in said support plate apertures, said locking means when released permitting movement of said mounting panel and thereby said fasteners outwardly from said support plate apertures as a unit, said mounting panel being adjustable in spacing relative to said support plate by rotation of the other end of said fasteners;
   (e) said apertures in said support plate comprising generally key-hole-shaped slots having their portions of reduced width extending from their enlarged portions in a single direction and said threaded fasteners having a head at said one end thereof greater in width than said reduced portion of said slots but of lesser width than the enlarged portions thereof, said fasteners having a neck portion adjacent said head of lesser width than the reduced portion of said slots so as to be fully slidable therein, and
   (f) said locking means comprising a member slidably supported on said support plate with a portion bearing against said mounting panel to retain said fasteners in the reduced portions of said slots, and means for releasably locking said member in position bearing against said mounting panel.

2. The adjustable panel assembly of claim 1 wherein said member is of generally L-shaped configuration with an elongated slot in its leg portion adjacent said mounting panel and wherein said releasable locking means is a threaded fastener seated in said slot and engaged in said support plate.

3. A flush-mounted adjustable panel assembly comprising the combination of:
   (a) a panel having a plurality of threaded apertures spaced thereabout;
   (b) a plurality of electrical components mounted on said panel and having operating handles;
   (c) a support plate having a plurality of apertures therein substantially aligned with said apertures in said panel;
   (d) a cover spaced from said panel on the side opposite from said support plate, said cover having a plurality of apertures therein through which the operating handles of said electrical components extend;
   (e) a plurality of threaded fasteners having one end rotatably seated in said support plate apertures and a shank portion threadably engaged in said threaded apertures of said panel;
   (f) locking means on said support plate releasably engaging said panel and holding said fasteners in said support plate apertures, said locking means when released permitting movement of said panel and thereby said fasteners outwardly from said support plate apertures as a unit, said panel being adjustable in spacing relative to said support by rotation of the other end of said fasteners so as to adjust the position of said operating handles with respect to the apertures in said cover;
   (g) said apertures in said support plate comprising generally key-hole-shaped slots having their portions of reduced width extending from their enlarged portions in a single direction and wherein said threaded fasteners have a head at said one end thereof greater in width than said reduced portion of said slots but of lesser width than the enlarged portion thereof, said fasteners having a neck portion adjacent said head of lesser width than the reduced portion of said slots so as to be fully slidable therein; and
   (h) said locking means comprising a member slidably supported on said support plate with a portion bearing against said panel to retain said fasteners in said reduced portions of said slots, and means for releasably locking said member in position bearing against said panel.

4. The adjustable panel assembly of claim 3 wherein said member is of generally L-shaped configuration with an elongated slot on its leg portion adjacent said panel and wherein said releasable locking means is a threaded fastener seated in said slot and engaged in said support plate.

References Cited

UNITED STATES PATENTS

| | | | |
|---|---|---|---|
| 2,183,872 | 12/1939 | Rowe | 317—119 |
| 2,599,695 | 6/1952 | Christensen | 317—119 |
| 3,312,873 | 4/1967 | Stanback | 317—119 |

ROBERT K. SCHAEFER, *Primary Examiner.*

H. O. JONES, *Assistant Examiner.*